No. 797,387. PATENTED AUG. 15, 1905.
A. T. VIGNERON.
PUNCTURE CLOSURE.
APPLICATION FILED MAR. 22, 1905.
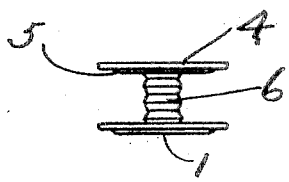
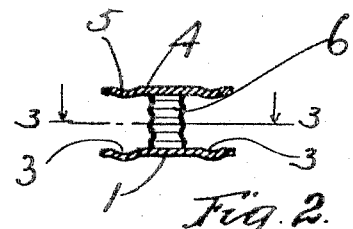
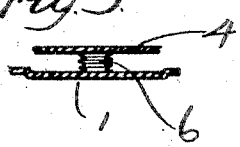
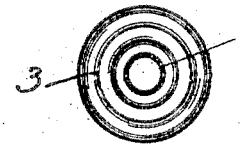
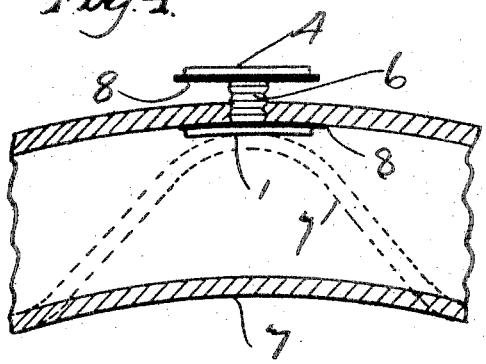
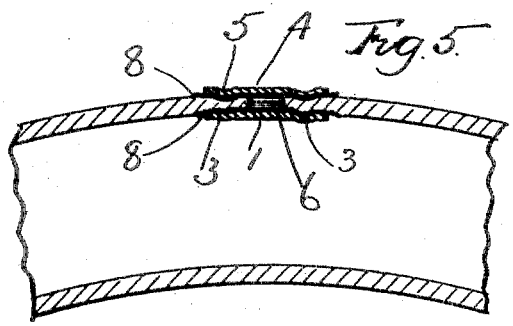
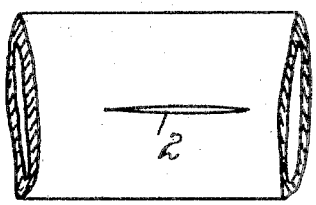
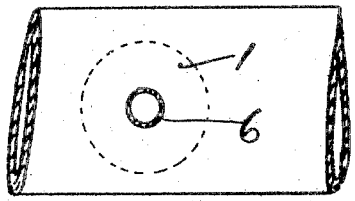
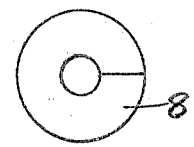
Witnesses
Frank A. Foster
E. J. Ogden
Inventor
Adolph T. Vigneron
By Howard E. Barlow
Attorney

UNITED STATES PATENT OFFICE.

ADOLPH T. VIGNERON, OF PROVIDENCE, RHODE ISLAND.

PUNCTURE-CLOSURE.

No. 797,387.          Specification of Letters Patent.          Patented Aug. 15, 1905.

Application filed March 22, 1905. Serial No. 251,450.

*To all whom it may concern:*

Be it known that I, ADOLPH T. VIGNERON, a citizen of the United States, residing at the city of Providence, in the county of Providence and State of Rhode Island, have invented certain new and useful Improvements in Puncture-Closures, of which the following is a specification, reference being had therein to the accompanying drawings.

This invention relates to an improved device for repairing or closing punctures or holes in pneumatic tires, hose, tubing, or other similar articles, and has for its object to produce a simple and practical puncture-closer which is particularly adapted for use in pneumatic vehicle-tires and which for the purpose of easy handling is made substantially in one piece—that is, the device has two heads which are joined together by a body portion, which body portion is capable of being shortened to bring the heads close together and hold them permanently in that position.

The device is more particularly designed to be used in the inner tubes of pneumatic tires, and when a puncture occurs the elastic tire is drawn apart or stretched, elongating the hole through which one of the heads of the device is passed. It simply remains then for the two heads to be pressed together, which may be done by a pair of pliers or other convenient means, setting both the heads firmly against both the inner and outer surfaces of the tire, thereby effectually and permanently repairing the punctured portion.

The invention is fully set forth in this specification, and more particularly pointed out in the appended claims.

In the accompanying drawings, Figure 1 is a side elevation of the device, showing the collapsible body in an extended position. Fig. 2 is a side elevation of the device in section. Fig. 3 is a plan of the device, showing the barrel in section on line 3 3 of Fig. 2. Fig. 4 shows the device as inserted into a tire with the body portion extended. Fig. 5 illustrates the puncture-closer applied to a tire with the body portion contracted and the heads firmly gripping the tire to close the puncture. Fig. 6 is a view of the tire, showing the aperture in the same with one of the heads inside the tire and the body portion in section. Fig. 7 illustrates a flexible washer which may be applied beneath either or both of the heads to prevent said metal heads from coming in direct contact with the tire. Fig. 8 represents the tire stretched to elongate the puncture, so that one of the heads of the device may be readily passed therethrough. Fig. 9 represents a modification or another form into which the heads may be pressed to take the place of corrugating the contact-surfaces.

Referring to the drawings, at 1 is the head or flange portion that is more particularly designed to be passed through the elongated slot or hole 2 (see Fig. 8) in the tire. This disk or flange that engages the inside surface of the tire is preferably formed of sheet metal. The contact-face of this disk may be made plain on both sides; but is preferably formed with one or more circular ridges, teeth, or corrugations 3 3 on its gripping-face, which corrugations serve to better grip and hold the material with which it comes in contact. An outer disk 4, designed to clamp the outside of the tire, may be similar in construction to the inner disk, and is also preferably corrugated at 5 to correspond to those of the inner disk, so that the extending portion of one disk will register with the grooves in the opposite one, or another simple and effective construction is to recess one head and make the others smaller in diameter to set into said recessed portion, as shown in Fig. 9. These inside and outside disks are connected together by a barrel or body portion 6, that is preferably scored or corrugated in a circular form around its periphery. This body portion is preferably made of a ductile material, such as brass or copper, thereby rendering it capable of being crushed or closed together to reduce its length, and the surplus stock on account of its grooves or corrugations is caused to lay in circular folds. In this manner the length of the barrel may be reduced, so as to bring the two heads near enough together to engage the inner and outer walls of the tire, and the stiffness of the stock when compressed in this manner is sufficient to firmly hold the heads in the desired position, tightly gripping each side of the wall of the tire and effectually close the puncture.

Another feature of the invention is the flexible washer 8, that may be placed under one or both heads to prevent these metal heads from coming in direct contact with the soft rubber of the tire, and thus obviates any possibility of wearing or cutting the same while the tire is in use.

One great advantage in this device over others for this purpose is that both of the heads 1 and 4 are permanently connected to the body portion either by solder or otherwise, making the whole practically one piece, thus avoiding the annoyance, which often occurs where the device is constructed in several pieces, of dropping and losing the different parts when stopping to repair on the road.

In applying this puncture-closer to the tire it is only necessary to elongate the hole either by stretching the tire or by applying a stretching-tool to the hole. One of the heads is then readily passed through the same, the tire is then released, and the walls closed tightly around the body of the device. The inside wall of the tire at 7 in Fig. 4 is bent up into the position shown in dotted lines and a pair of broad flat-nosed pliers applied to the closer, and the body portion on account of its construction and pliability is easily crushed into folds, bringing the two heads tightly into contact with the inner and outer walls of the tire, where they are tightly held by the crushed metal, effectually and permanently closing the puncture.

As may be seen from the above, any ordinary puncture can be permanently closed in but a few moments, without the aid of skilled mechanics, with but the use of a simple pair of pliers. The ease and rapidity with which it may be accomplished strongly recommends it to the dealer as well as the user of automobiles, as the latter by its use can easily and quickly repair his own tires while out on the road.

Having thus described my invention, what I claim as new, and desire to secure by Letters Patent, is—

1. A puncture-closer consisting of a body portion having two heads, said body portion adapted to be crushed or compressed and shortened to bring said heads closer together and retain them in that position.

2. In a tire-puncture closer, a metallic body, and two heads integral therewith, said body adapted to be compressed to shorten the same and cause said heads to clamp and retain the material of the tire between them.

3. In a puncture-closer, a compressible body portion having two heads, and means on the engaging surfaces of one or both of said heads for gripping and binding the material against which they come in contact, said body portion adapted to be crushed and shortened to allow said heads to be forced against said material.

4. In a puncture-closer, a compressible body portion having two heads integral therewith and circular ridges or corrugations on the engaging surfaces of one or both of said heads for gripping and binding the material against which they come in contact, said body portion adapted to be crushed and shortened to allow said heads to be forced against said material.

5. In a puncture-closer, two heads, a corrugated tubular body portion, said body being adapted to be crushed to shorten the same and bring the said heads nearer together.

In testimony whereof I affix my signature in presence of two witnesses.

ADOLPH T. VIGNERON.

Witnesses:
HOWARD E. BARLOW,
E. I. OGDEN.